(No Model.)
H. S. TUTHILL.
ROTATABLE DELIVERY WAGON.
No. 470,022. Patented Mar. 1, 1892.
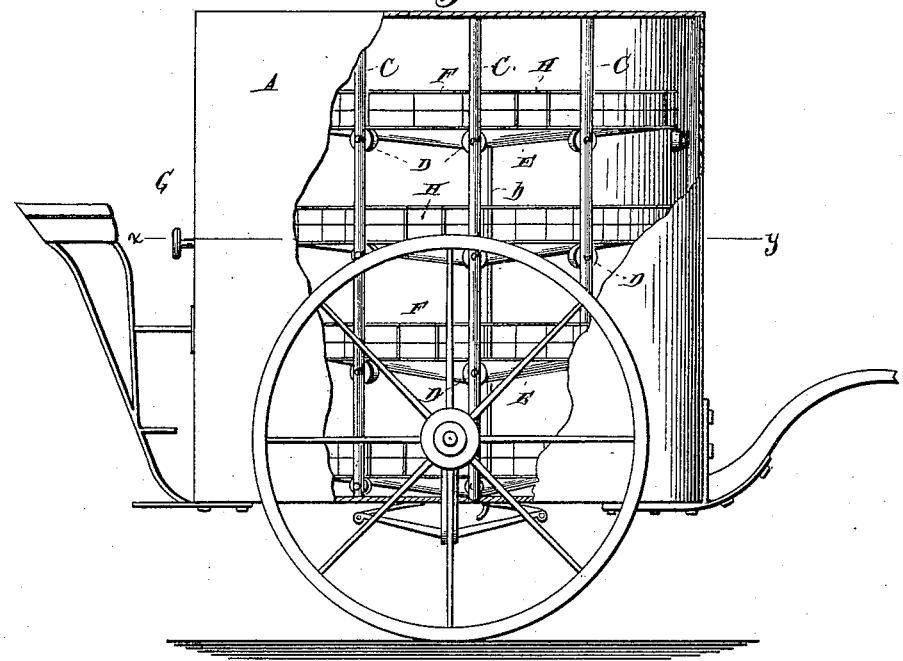
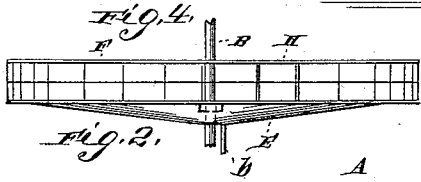
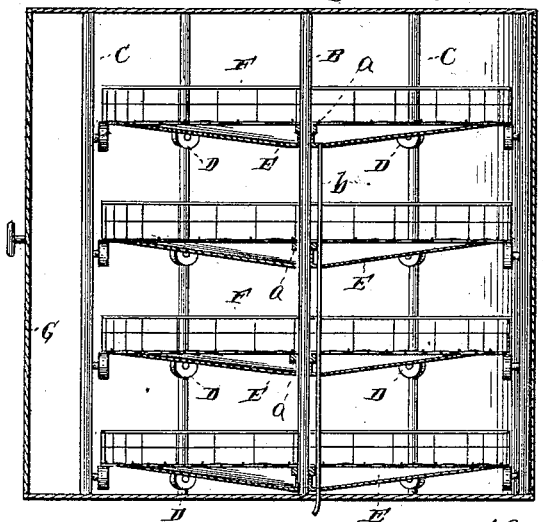
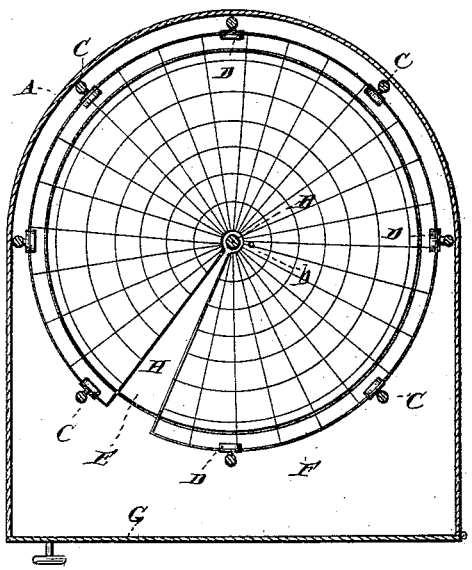
Witnesses:
Charles H. Forbes
Simeon Folsom
Horace S. Tuthill, Inventor:
by A. S. Cushman
Atty.

UNITED STATES PATENT OFFICE.

HORACE S. TUTHILL, OF NEW YORK, N. Y.

ROTATABLE DELIVERY-WAGON.

SPECIFICATION forming part of Letters Patent No. 470,022, dated March 1, 1892.

Application filed June 3, 1891. Serial No. 395,167. (No model.)

*To all whom it may concern:*

Be it known that I, HORACE S. TUTHILL, a citizen of the United States of America, residing in the city, county, and State of New York, have invented a new and useful Improvement in Rotatable Delivery-Wagons, of which the following is a full, clear, concise, and exact description, reference being had to the accompanying drawings, in which similar letters refer to similar parts throughout the several views.

My invention relates to devices for the convenient charging, transportation, and discharging of goods in and from delivery-wagons of a class having interior rotatable stands and similar to the invention for which Letters Patent were granted me on the 3d day of March, 1891, No. 447,440, for an improvement in delivery-wagons.

The objects I have in view are to provide means for the rotation of an entire load or of the several trays thereof around either a stationary or a movable central shaft, according to whether the stand is constructed with either kind of shaft, or without a central shaft where a stand is made without such shaft, and independently of the rotation of such stand containing the general load, such as is described and shown in such Letters Patent; to diminish the friction of such rotation; to facilitate the introduction and withdrawal of each bottle or other package separately; to economize space, and to provide means for collecting and carrying off drippings and intercepting their passage from one tray to another.

These objects I accomplish by my invention, which consists of a series of rotatable trays supported in whole or in part at their peripheries upon sliding or rolling supports within suitable guides, each superior tray being provided with a suitable portway to facilitate access to the contents of the next inferior tray, and a like series of corresponding drip-pans for the interception, collecting, and carrying off of any superfluous liquid matter, so as to prevent the same from dripping from one pan to another.

In the accompanying drawings, Figure 1 is a view of a delivery-wagon with portions of its body cut away to show the interior parts embodying my invention. Fig. 2 is a vertical section or view of the same interior, taken in the medial longitudinal plane of Fig. 1. Fig. 3 is a sectional view taken in the horizontal plane indicated by the letters X Y of Fig. 1. Fig. 4 is a separate view of a tray, drip-pan, and discharge-pipe and their manner of adjustment around a central shaft.

A represents the body inclosing the rotary parts; B, central shaft; C, standard-guides; D, anti-friction rollers; E, drip-pan; F, tray; G, door; H, portway; $a$, collar; $b$, drip-pipe.

The body A is the exterior casing of a delivery-wagon such as is shown in the Letters Patent above mentioned and contains the parts which are the subject of my improvement. The central shaft B is preferably a hollow iron cylinder, either journaled at top and bottom into the body A, or, if desired, rigidly attached thereto, and at convenient intervals is provided with a series of collars $a$, adapted to afford a central lodgment and support to the trays F, rotating thereon. At convenient points within the body vertical standard bars or rods C are rigidly established, extending from top to bottom, each bar being provided at corresponding distances opposite such collar with vertically-acting anti-friction rollers D, for the purpose of affording peripheral support to the trays F and to permit of their rotation thereon and within the standard-bars, which thus serve as guideways to the rotation of the trays. The trays F are circular in area, and are preferably constructed of wire-netting, and provided with a circular rim extending around the entire periphery at a sufficient height to effectually retain objects placed upon the tray. A vacant space is left in each tray, as shown at H in Fig. 3, extending from the central shaft to its outer edge and of sufficient width to form a port or way for the convenient introduction and manipulation of the contents of the trays. A drip-pan E, with a corresponding port, is suspended beneath each tray, as shown in Figs. 2 and 4, for the purpose of intercepting and collecting any drippings and preventing them from falling from one tray to another. The pans are constructed of tin or any suitable material, with an inclination toward the center shaft, where at any convenient point a conduit or drip-pipe $b$ permits of their discharge through the bottom of the wagon. The trays may be made entire, but are preferably made of two or more sectional parts, as shown in Fig. 2, to be attached to each other in position by a hook or any similar device. Thus the trays can be readily withdrawn for the purpose of cleansing them.

In loading the wagon with dairy bottles the ports H are turned to the rear, which admits of the insertion of the bottles and within the rim of the tray, when the upper part of the bottle is raised into the port above and lowered into its place, and thus in construction no more space is needed between the trays than equals the height of the bottles. The several trays being equally rotatable, any desired bottle in the lower trays may be withdrawn without disturbing the rest by turning the tray containing it to the door and then turning the next superior tray until the port H is directly over the bottle to be removed, when it may readily be withdrawn. The upper tray may be utilized for ice, if desired, and the drip-pans will collect and carry off through the drip-pipe any superfluous moisture in the wagon arising therefrom.

What I claim as new, and for which I ask that Letters Patent may be granted, is—

1. In a delivery-wagon, a series of separately-rotatable trays peripherally and centrally supported, substantially as described.

2. In a delivery-wagon, the combination of a series of standard-bars C, provided with peripheral supports D, and a series of trays F, supported centrally by a shaft B and separately rotatable at their peripheries upon such supports D.

3. In a delivery-wagon, a series of standard-bars C, provided with peripheral supports D, in combination with a series of trays F, supported centrally by a shaft B, and each tray being provided with a dripping-pan E, and a conduit b, and port H, substantially as described, and being separately rotatable at its periphery upon such support D as a whole to form, in combination with the body A, a rotatable interior stand, substantially in the manner and for the purposes described.

4. As an appurtenant to a delivery-wagon stand, a tray provided with a U or V shaped port H, extending from the central shaft to its outer rim, substantially in the manner and for the purposes described.

HORACE S. TUTHILL.

Witnesses:
H. S. TUTHILL, Jr.,
GEO. W. WALLACE.